(12) United States Patent
Bogers et al.

(10) Patent No.: US 10,876,214 B2
(45) Date of Patent: Dec. 29, 2020

(54) ELECTROLYTIC CELL FOR INTERNAL COMBUSTION ENGINE

(71) Applicant: INNOVATIVE HYDROGEN SOLUTIONS, INC., Aurora (CA)

(72) Inventors: Timothy D. Bogers, Aurora (CA); Joseph Charles Williams, Aurora (CA); Arne R. Lean, Aurora (CA)

(73) Assignee: Innovative Hydrogen Solutions Inc., Aurora (CA)

( * ) Notice: Subject to any disclaimer, the term of this patent is extended or adjusted under 35 U.S.C. 154(b) by 0 days.

(21) Appl. No.: 16/064,794

(22) PCT Filed: Dec. 20, 2016

(86) PCT No.: PCT/CA2016/051512
§ 371 (c)(1),
(2) Date: Jun. 21, 2018

(87) PCT Pub. No.: WO2017/113009
PCT Pub. Date: Jul. 6, 2017

(65) Prior Publication Data
US 2019/0010621 A1    Jan. 10, 2019

Related U.S. Application Data

(60) Provisional application No. 62/272,935, filed on Dec. 30, 2015.

(51) Int. Cl.
*C25B 9/06* (2006.01)
*C25B 9/00* (2006.01)
(Continued)

(52) U.S. Cl.
CPC .................. *C25B 9/06* (2013.01); *C25B 1/04* (2013.01); *C25B 9/00* (2013.01); *C25B 11/03* (2013.01);
(Continued)

(58) Field of Classification Search
CPC ....... C25B 1/02–12; C25B 9/06; C25B 11/03; C25B 15/02; C25B 15/08; C25B 1/04;
(Continued)

(56) References Cited

U.S. PATENT DOCUMENTS 4,368,696 A    1/1983  Reinhardt
5,980,726 A *  11/1999 Moulthrop, Jr. .......... C25B 1/02
                                                204/239
(Continued)

FOREIGN PATENT DOCUMENTS

| CA | 2407875 | 10/2002 |
|----|---------|---------|
| CA | 2604217 | 10/2006 |

(Continued)

*Primary Examiner* — Ciel P Contreras
(74) *Attorney, Agent, or Firm* — Ryan W. Dupuis; Ade & Company Inc; Kyle R. Sutterthwaite

(57) ABSTRACT

An electrolytic system for an internal combustion engine includes an electrolyte tank for receiving an anode electrode, a cathode electrode, and an electrolytic fluid therein for communication with the anode and cathode. A power source applies an electrical potential between the anode and the cathode to generate a current through the electrolytic fluid and produce an electrolytic reaction in the electrolyte tank which produces combustible gases. A gas outlet communicates the combustible gases from the electrolyte tank to the internal combustion engine. At least one of the electrodes A hollow passage which does not communicate with the electrolytic fluid in the electrolyte tank extends through one of the electrodes to receive a heat exchange fluid circulated therethrough so as to be arranged to exchange heat with said at least one of the electrodes.

13 Claims, 7 Drawing Sheets

(51) Int. Cl.
*C25B 11/03* (2006.01)
*C25B 15/02* (2006.01)
*C25B 15/08* (2006.01)
*C25B 1/04* (2006.01)
*F02M 25/12* (2006.01)
*F02B 43/10* (2006.01)

(52) U.S. Cl.
CPC ............ *C25B 11/035* (2013.01); *C25B 15/02* (2013.01); *C25B 15/08* (2013.01); *F02M 25/12* (2013.01); *F02B 2043/106* (2013.01); *Y02E 60/36* (2013.01); *Y02T 10/12* (2013.01)

(58) Field of Classification Search
CPC ......... C25B 9/00; C25B 11/035; F02M 25/12; F02B 2043/106; Y02E 60/36; Y02T 10/12
See application file for complete search history.

(56) References Cited

U.S. PATENT DOCUMENTS

| | | | |
|---|---|---|---|
| 2004/0013923 A1* | 1/2004 | Molter | H01M 8/04089 429/413 |
| 2005/0217991 A1 | 10/2005 | Dahlquist | |
| 2010/0012090 A1 | 1/2010 | Lewis | |
| 2010/0213049 A1* | 8/2010 | Burtch | C25B 1/02 204/242 |
| 2012/0234265 A1* | 9/2012 | Ball | C25B 1/08 123/3 |
| 2014/0023886 A1* | 1/2014 | Mastena | C25B 1/04 429/9 |
| 2014/0367272 A1* | 12/2014 | Haywood | C25B 15/08 205/341 |

FOREIGN PATENT DOCUMENTS

| | | | |
|---|---|---|---|
| JP | 2004-143481 | 5/2004 | |
| JP | 2004143481 A * | 5/2004 | ............. C25B 11/02 |
| JP | 2012-122092 | 6/2012 | |
| RU | 2091507 | 9/1997 | |

\* cited by examiner

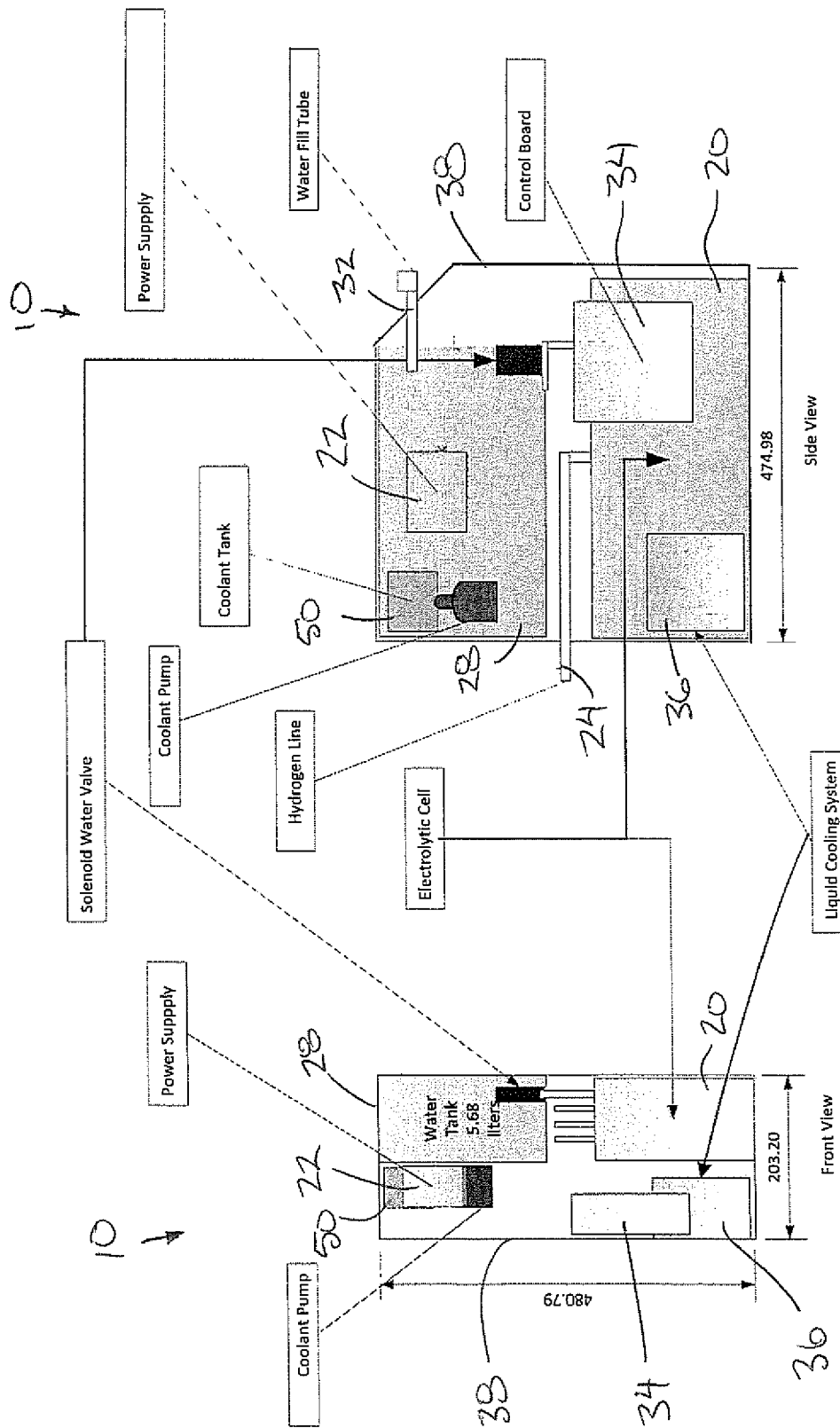

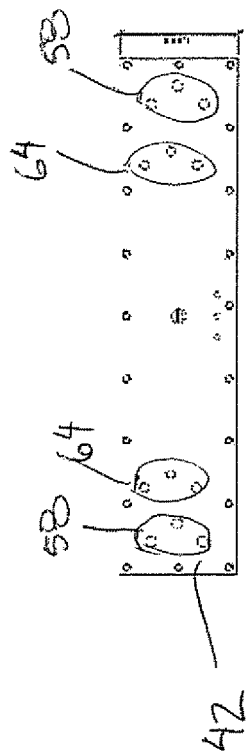
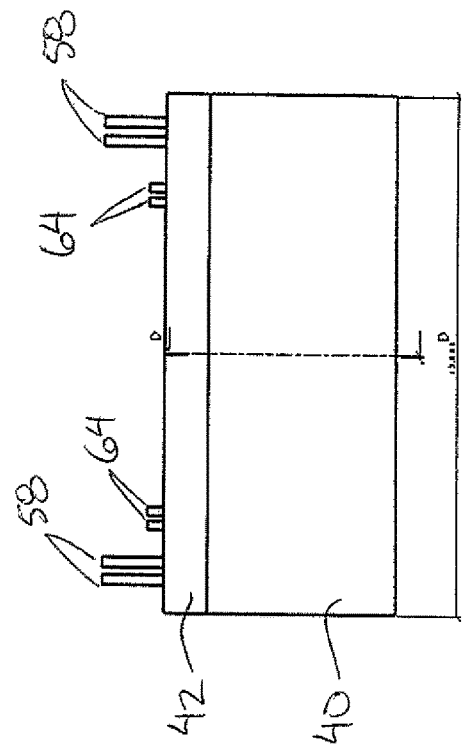
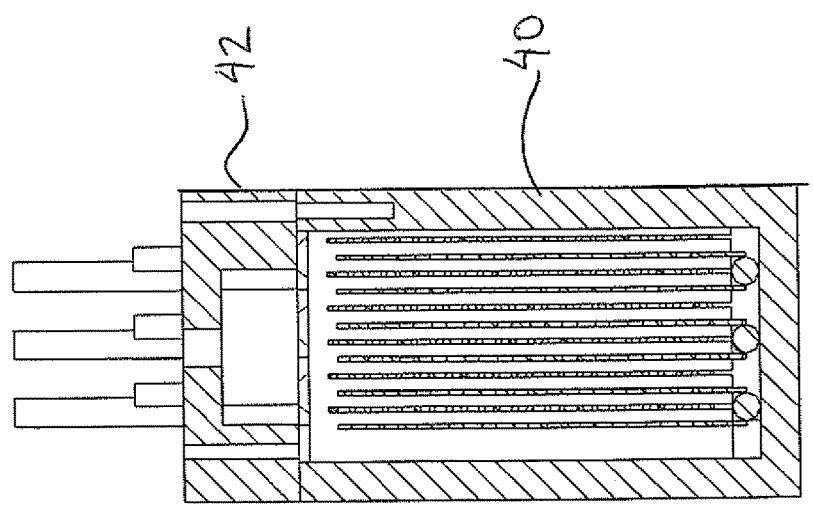

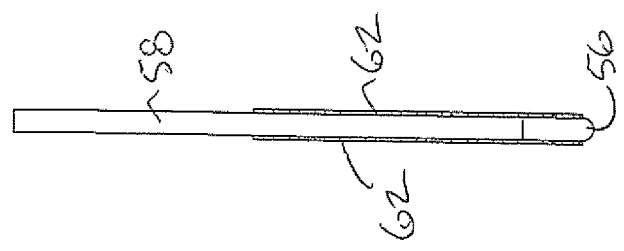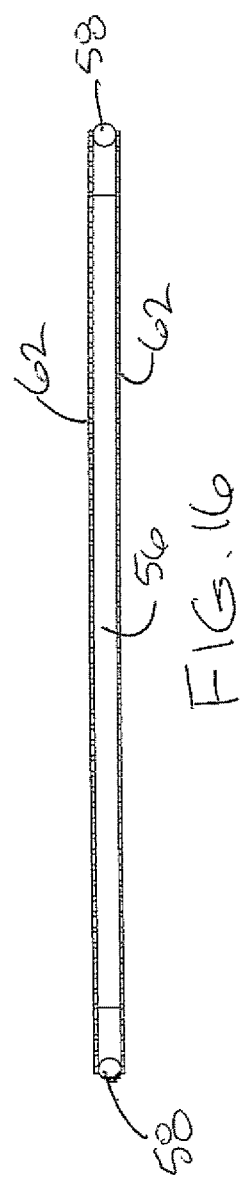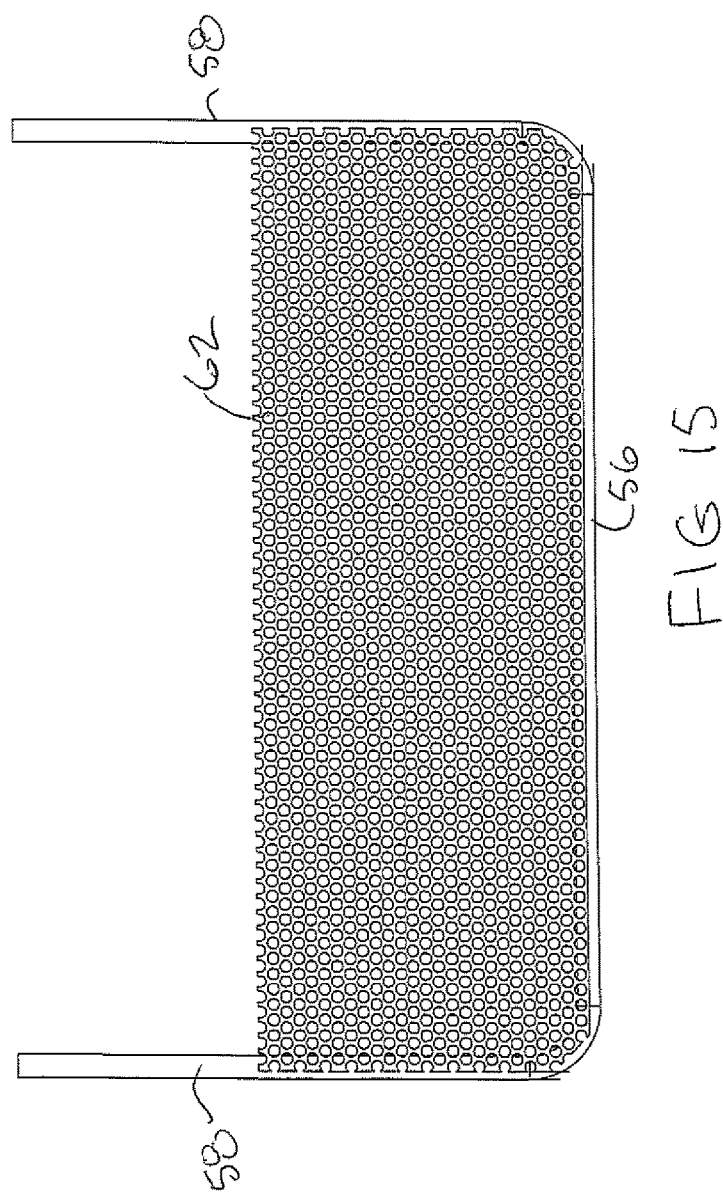

ELECTROLYTIC CELL FOR INTERNAL COMBUSTION ENGINE

FIELD OF THE INVENTION

The present invention relates to an electrolytic cell for producing gases for enhancing combustion in an internal combustion engine.

BACKGROUND

It is known that the addition of hydrogen and oxygen gas to an internal combustion engine enhances combustion by reducing noxious emissions and improving mileage. It is further known that hydrogen and oxygen gases can be readily produced by electrolysis of water in an onboard electrolyser for a vehicle. Various related examples of electrolytic cells are listed in the following patents: U.S. Pat. No. 6,311,648 (Larocque), U.S. Pat. No. 4,875,988 (Aragon), U.S. Pat. No. 41,966,086 (Scoville), U.S. Pat. No. 5,178,118 (Nakamats), U.S. Pat. No. 4,368,696 (Reinhardt), U.S. Pat. No. 5,711,865 (Caesar), U.S. Pat. No. 4,627,897 (Tetzlaff et al), U.S. Pat. No. 4,111,160 (Talenti), U.S. Pat. No. 6,257,175 (Mosher et al.), U.S. Pat. No. 3,915,834 (Wright et al.), U.S. Pat. No. 4,442,801 (Gynn et al.), U.S. Pat. No. 4,196,068 (Scoville), U.S. Pat. No. 6,804,949 (Andrews et al.), U.S. Pat. No. 6,857,397 (Zagaja et al.), U.S. Pat. No. 6,464,854 (Andrews et al.), Canadian patent 2,349,508, and US patent application publication no. US2010/0147231 by Bogers et al.

In general many prior art uses of electrolysers are either far too complex to manufacture at a reasonable cost or pose certain safety risks due to the potential for explosions. Many are inefficient and do not feed the combustion enhancing gases produced by the electrolyser to the engine in an efficient or reliable manner. A further problem with known electrolytic cells for use with internal combustion engines relates to the management of temperature in varying climates. In colder climates, heat must be provided to the water supply to prevent freezing, whereas in warmer climates the electrolytic fluid and power supply typically require cooling in order to operate at optimal efficiency, however, known electrolytic cells fails to adequately address the management of temperature in the cell.

SUMMARY OF THE INVENTION

According to one aspect of the invention there is provided an electrolytic system for an internal combustion engine comprising:

an electrolyte tank for receiving an electrolytic fluid therein;

a plurality of electrodes including at least one anode and at least one cathode supported in the electrolyte tank for communication with the electrolytic fluid therein;

a power source arranged to apply an electrical potential between said at least one anode and said at least one cathode so as to generate a current through the electrolytic fluid and produce an electrolytic reaction in the electrolyte tank which produces combustible gases;

a gas outlet arranged to communicate the combustible gases from the electrolyte tank to the internal combustion engine;

a hollow passage within at least one of the electrodes, in which the hollow passage does not communicate with the electrolytic fluid in the electrolyte tank; and a coolant system arranged to circulate a heat exchange fluid through the hollow passage in said at least one of the electrodes so as to be arranged to exchange heat with said at least one of the electrodes.

The hollow passage extends through at least a portion of said at least one cathode in the electrolytic tank. The one or more cathodes may each include a hollow tube portion extending through the electrolytic tank which defines said hollow passage therein.

Preferably the cathode comprises a plurality of hollow tube portions extending through the electrolytic tank independently of one another, the plurality of hollow tube portions collectively defining said hollow passage therein.

The hollow tube portion of the cathode may extend through the electrolytic tank so as to define said hollow passage therein and at least one plate portion joined to said at least one hollow tube portion. The plate portion preferably comprises a perforated sheet.

The hollow tube portion of the cathode preferably extends and/or communicates through a boundary of the electrolytic tank to the power source and extends about at least a portion of a perimeter of said at least one plate portion within the electrolytic tank.

The plate portion of each cathode may comprise a pair of plates mounted parallel and spaced apart from one another at diametrically opposing sides of the respective hollow tube portion.

The system preferably further includes a cooling device supported externally of the electrolytic tank, wherein the coolant system is arranged to circulate the heat exchange fluid between said hollow passage and the cooling device.

The cooling device may comprise (i) a radiator receiving the heat exchange fluid therethrough and a cooling fan arranged to direct a flow of air across the radiator, (ii) a refrigeration device arranged to undergo a refrigeration cycle for cooling the heat exchange fluid circulated therethrough, (iii) any other device suitable for providing similar cooling, or (iv) any combination thereof.

A heat sink may also be provided on the power source which is arranged to receive the heat exchange fluid of the coolant system circulated therethrough.

When a water tank is operatively connected to the electrolyte tank for replenishing fluid in the electrolyte tank, preferably a heat exchange passage is in heat exchanging relationship with the water tank which is arranged to receive the heat exchange fluid of the coolant system circulated therethrough.

The gas outlet may comprise a rigid tube fully spanning between an inlet end at the electrolytic tank and an outlet end at a combustion air intake of the internal combustion engine in which the outlet end is at greater elevation than the inlet end. The rigid tube may comprise a stainless steel tube.

The system may further include an expansion chamber connected in series with the gas outlet proximate the outlet end of the rigid tube so as to be arranged to reduce pressure and condense water vapor in the flow of the combustible gases prior to reaching the intake of the internal combustion engine.

According to a second aspect of the present invention there is provided an electrolytic system for an internal combustion engine comprising:

an electrolyte tank for receiving an electrolytic fluid therein;

a plurality of electrodes including at least one anode and at least one cathode supported in the electrolyte tank for communication with the electrolytic fluid therein;

a power source arranged to apply an electrical potential between said at least one anode and said at least one cathode so as to generate a current through the electrolytic fluid and produce an electrolytic reaction in the electrolyte tank which produces combustible gases;

a gas outlet arranged to direct a flow of the combustible gases from the electrolyte tank to the internal combustion engine;

a heat exchanger passage extending through the electrolytic tank such that the heat exchanger passage does not communicate with the electrolytic fluid in the electrolyte tank;

a cooling device supported externally of the electrolytic tank; and a coolant system arranged to circulate a heat exchange fluid between the heat exchanger passage and the cooling device.

The cooling device may comprise i) a radiator receiving the heat exchange fluid therethrough and a cooling fan arranged to direct a flow of air across the radiator, or alternatively, ii) a refrigeration device arranged to undergo a refrigeration cycle for cooling the heat exchange fluid circulated therethrough.

Preferably there is also provided i) a heat sink on the power source which is arranged to receive the heat exchange fluid of the coolant system circulated therethrough, and ii) a water tank operatively connected to the electrolyte tank for replenishing fluid in the electrolyte tank and a heat exchange passage in heat exchanging relationship with the water tank which is arranged to receive the heat exchange fluid of the coolant system circulated therethrough.

According to a third aspect of the present invention there is provided an electrolytic system for an internal combustion engine comprising:

an electrolyte tank for receiving an electrolytic fluid therein;

a plurality of electrodes including at least one anode and at least one cathode supported in the electrolyte tank for communication with the electrolytic fluid therein;

a power source arranged to apply an electrical potential between said at least one anode and said at least one cathode so as to generate a current through the electrolytic fluid and produce an electrolytic reaction in the electrolyte tank which produces combustible gases; and a gas outlet arranged to direct a flow of the combustible gases from the electrolyte tank to the internal combustion engine;

wherein the gas outlet comprising a rigid tube fully spanning between an inlet end at the electrolytic tank and an outlet end at a combustion air intake of the internal combustion engine in which the outlet end is at greater elevation than the inlet end.

The rigid tube preferably comprises a stainless steel tube at a continuous upward slope from the inlet end to the outlet end thereof.

According to a fourth aspect of the present invention there is provided an electrolytic system for an internal combustion engine comprising:

an electrolyte tank for receiving an electrolytic fluid therein;

a plurality of electrodes including at least one anode and at least one cathode supported in the electrolyte tank for communication with the electrolytic fluid therein;

a power source arranged to apply an electrical potential between said at least one anode and said at least one cathode so as to generate a current through the electrolytic fluid and produce an electrolytic reaction in the electrolyte tank which produces combustible gases;

a gas outlet arranged to direct a flow of the combustible gases from the electrolyte tank to the internal combustion engine; and an expansion chamber connected in series with the gas outlet proximate the outlet end of the rigid tube so as to be arranged to reduce pressure and condense water vapor in the flow of the combustible gases prior to reaching the intake of the internal combustion engine.

One embodiment of the invention will now be described in conjunction with the accompanying drawings in which:

BRIEF DESCRIPTION OF THE DRAWINGS

FIG. 3 is a schematic side elevational view of a housing supporting various components of the electrolytic system therein;

FIG. 4 is a schematic end elevational view of the housing supporting the various components of the electrolytic system therein;

FIG. 7 is a side elevational view of the electrolytic cell;

FIG. 8 is a top plan view of the electrolytic cell;

FIG. 9 is a sectional view of the electrolytic cell;

FIGS. 15, 16 and 17 are side elevational, top plan and end elevational views respectively of the cathode unit of FIG. 14.

In the drawings like characters of reference indicate corresponding parts in the different figures.

DETAILED DESCRIPTION

Figure 1:
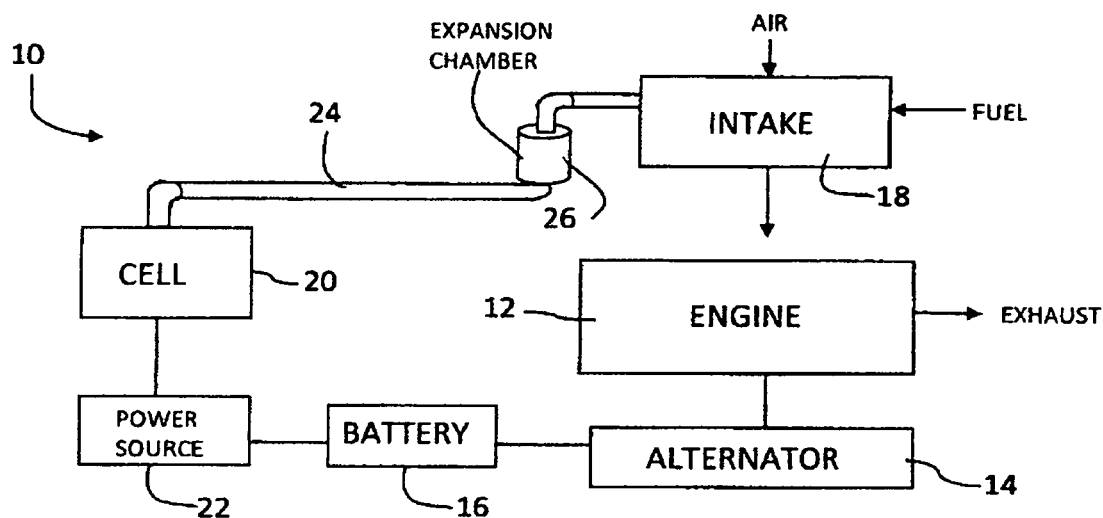
FIG. 1 is a schematic representation of the electrolytic system in connection with an internal combustion engine.

Referring to the accompanying figures there is illustrated an electrolytic system generally indicated by reference numeral 10. The system 10 is suited for use with an internal combustion engine 12 of the type commonly employed in vehicles and watercraft for example. The engine 12 typically drives an alternator 14 which generates electricity for use by the engine and for charging a battery 16. The engine 12 includes an intake 18 for receiving combustion air and a fuel supply for supplying fuel to be consumed by the engine during operation.

The electrolytic system 10 of the present invention includes an electrolyte tank 20 receiving an electrolytic fluid therein, for example water with KOH in solution therein at a concentration of approximately 30% relative to the water. The power source 22 receives electrical power from the battery and/or alternator of the engine to apply an electrical potential to electrodes within the electrolyte tank 20 to generate a current through the electrolytic fluid in the tank and produce an electrolytic reaction that produces hydrogen and oxygen gases.

A gas outlet 24 communicates from the tank 20 to the intake 18 of the engine to direct the produced hydrogen and oxygen gases from the tank into the engine. The gas outlet comprises a rigid stainless steel tube which is mounted at an inlet end to communicate through the top wall of the tank 20 at a lateral and longitudinal central location thereon. The rigid stainless steel tube extends at a continuous upward incline, for example a 2° slope from the inlet end to an outlet end in proximity to the intake of the engine. A resilient coupling may be provided between the inlet end of the gas outlet tube and the tank 20 to minimize transference of vibration therebetween.

An expansion chamber 26 is connected in series between the outlet end of the gas outlet tube and the intake of the engine in which the cross sectional flow area of the gas outlet is increased plural times relative to the stainless steel tube such that the pressure of the flow of combustion gases from the tank to the engine is dramatically reduced at the expansion chamber. The reduction in pressure encourages water vapour contained in the gas flow to be condensed and to flow back into the tank 20 by the continuous slope of the stainless steel tube portion of the gas outlet. The expansion chamber is provided in the form of an upright cylindrical vessel in which the stainless steel tube communicates with the expansion chamber centrally in the bottom end thereof to ensure condensate communicates with the tube to be directed back towards the electrolyte tank. An outlet of expansion chamber is provided centrally in the top end thereof for communicating gases from the chamber to the intake of the engine. A resilient coupling may be provided between the outlet end of the gas outlet tube and the expansion chamber 26, or alternatively between the expansion chamber 26 and the intake of the engine to minimize transference of vibration between the engine and the gas outlet tube.

The system 10 further includes a water supply tank 28 filled with water for replenishing water content in the electrolyte tank as gases are produced by electrolysis. A fill tube 30 communicates between the bottom end of the water supply tank 28 and the top wall of the electrolyte tank with a fill valve 32 connected in series therewith. The fill valve is a solenoid operated valve which opens responsive to a measured level in the electrolyte tank falling below a prescribed lower limit. The valve remains open until sufficient fluid flows from the water supply to the electrolyte tank that the level rises up to a prescribed upper limit at which point the valve is closed until the level falls below the prescribed lower limit again.

A controller 34 is provided in the form of a printed circuit board connected to the fill valve 32 and various switches in communication with the electrolyte tank. The switches include an upper limit switch and a lower limit switch in the form of electrical contacts within the electrolyte tank to determine fluid level. The switches may also include one or more safety switches to deactivate the power supply in the event of an unsafe condition being detected such as a fluid level which is too low or an excess temperature or pressure for example. The controller may also be used to control the amount of current applied to the electrodes of the electrolyte tank according to fuel demands of the engine as monitored by various sensors or switches monitoring engine performance characteristics.

The general operation of the controller is substantially similar to the operation disclosed in US patent application publication 2010/0147231 by Bogers et al, the disclosure of which is incorporated herein by reference.

Figure 2:
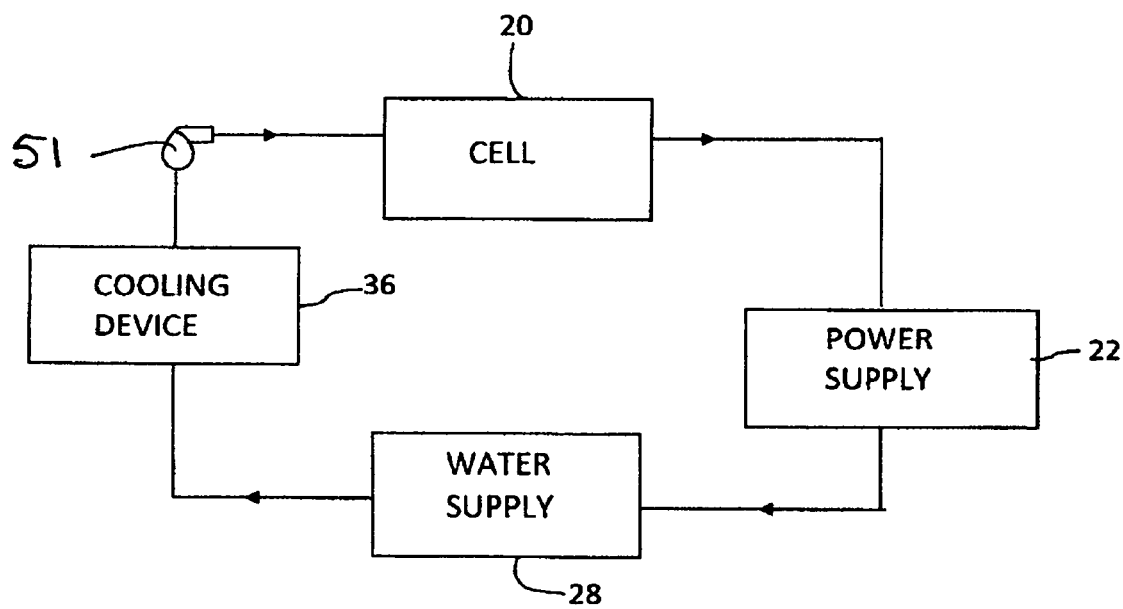
FIG. 2 is a schematic representation of a heat exchanger fluid path for managing temperature of various components of the electrolytic system.
Figure 6:
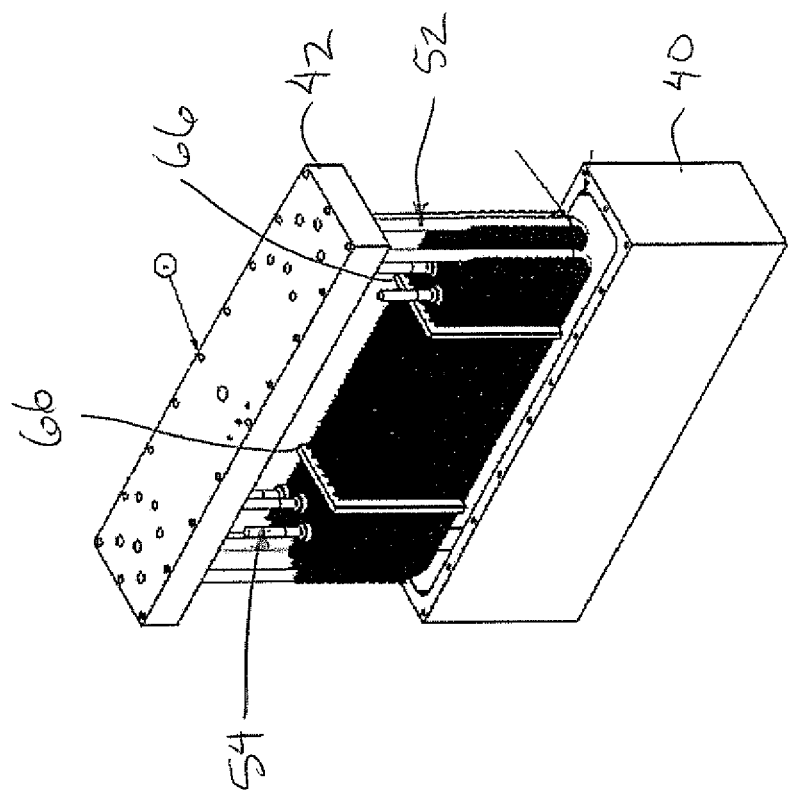
FIG. 6 is an exploded perspective view of the electrolytic cell.
Figure 5:
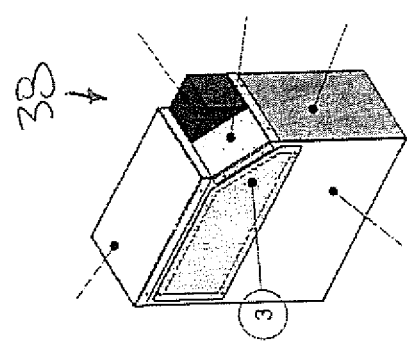
FIG. 5 is a perspective view of an exterior of the housing supporting the various components of the electrolytic system therein.
Figure 10:
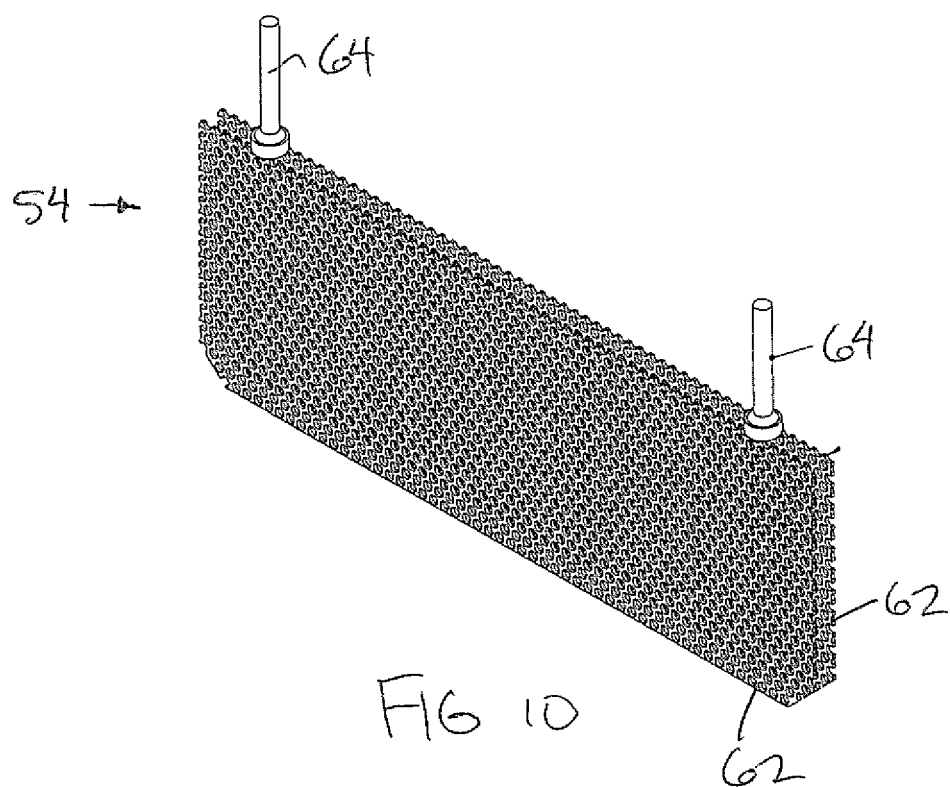
FIG. 10 is a perspective view of one of the anode units of the electrolytic cell.
Figure 14:
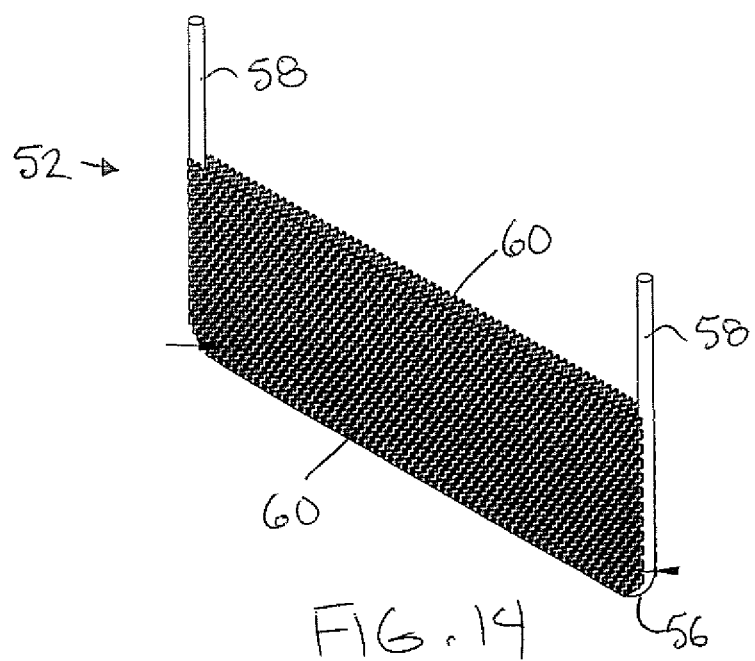
FIG. 14 is a perspective view of one of the cathode units of the electrolytic cell.
Figure 12:
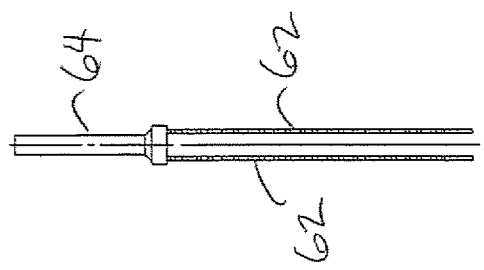
FIGS. 11, 12 and 13 are side elevational, end elevational and top plan views respectively of the anode unit of FIG. 10.
Figure 13:
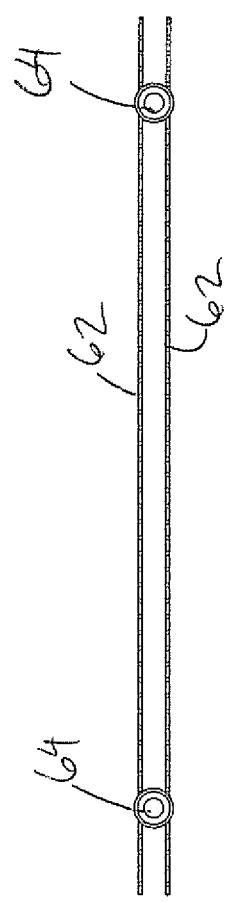
Figure 11:
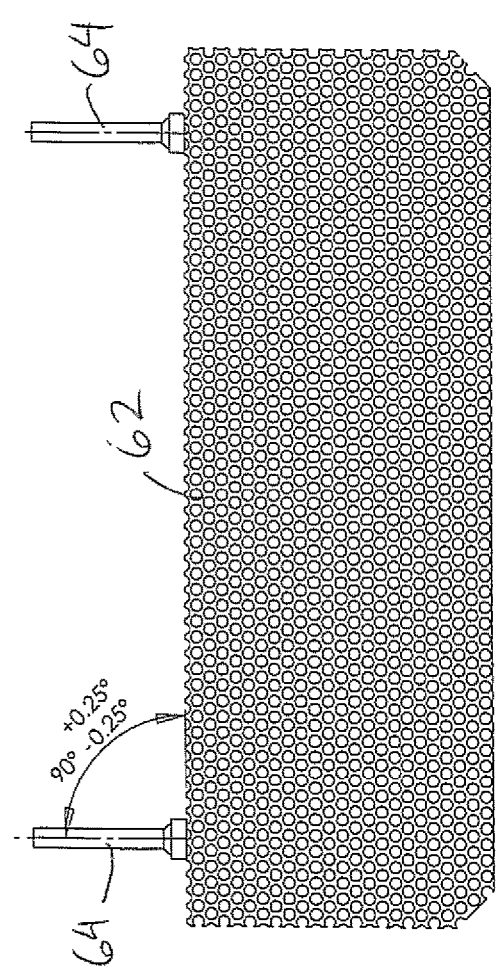

The electrolytic system 10 further includes a cooling device 36 which is part of a coolant system that provides cooling to one or more components of the electrolytic system. The cooling system circulates a heat exchange fluid between the cooling device 36 and at least one heat exchange passage extending through the electrolyte tank in a closed loop between the cell 20, the power supply 22, the water supply 28 and the cooling device 36 as shown in FIG. 2 and as described in further detail below.

The system in this instance also includes a heat sink at least partially surrounding the power source 22. The power source serves to regulate voltage from a 12 V source on the associated vehicle engine to a level of approximately 3V applied to the electrodes of the electrolyte tank. The heat sink is in sufficient proximity to the power source to absorb heat from the voltage transformation and is provided with a heat exchange passage extending therethrough which receives the heat exchange fluid of the coolant system circulated therethrough.

The various components of the electrolytic system 10 generally supported within a common housing 38 in the form of a rectangular stainless steel box. The housing has a height and length in the longitudinal direction which are in close proximity to one another, however the housing is much narrower in a lateral direction.

The electrolyte tank received in the housing in this instance comprises i) a lower portion 40 having a bottom wall, two side walls, and an end wall which are formed as a unitary seamless member of ultra high molecular weight plastic material with an open top end, and ii) a lid portion 42 which fully spans the open top end of the lower portion 40. The lid portion 42 is arranged to be sealed to the upper perimeter edge of the lower portion using a gasket and a plurality of fasteners to clamp the lid portion and lower portion together about the full perimeter of the seam therebetween. The electrolyte tank is sized to be elongate in the longitudinal direction of the housing to span substantially the full length of the housing in proximity to the bottom end thereof while being narrower in the lateral direction than the surrounding housing, and shorter in height than the surrounding housing.

The water supply tank 28 similarly comprises a hollow portion 44 defining the majority of the hollow interior of the tank with only one open side, and a lid portion 46 arranged to span the open side of the hollow portion 44 using a perimeter gasket and fastener secured about the full perimeter of the seam between the two portions. The water tank is similarly elongate in the longitudinal direction of the housing to span most of the length of the housing in the longitudinal direction above the electrolyte tank having a height which can be received between the top end of the electrolyte tank and the top end of the housing. The water tank is similarly narrower in the lateral direction than the surrounding housing.

A fill tube 48 of the water supply tank communicates between the top end of the water supply tank and a location external of the housing with a threaded fill cap securable to the outer end of the fill tube to selectively open or close the fill tube and allow an operator to pour water therein as required to maintain a suitable level within the water tank when the cap is open.

The power supply 22 and accompanying heat sink are typically mounted within the interior of the housing adjacent to the water tank towards the top end of the housing.

A reservoir 50 for containing excess heat exchange fluid is also situated adjacent to the water tank towards the top end of the housing. A pump 51 of the cooling system communicates with the reservoir 50 and serves to circulate heat exchange fluid in a generally closed loop through the electrolytic system. The heat exchange fluid is arranged to be circulated from the heat exchange passage in the heat sink on the power supply 22, to a heat exchange passage communicating through the water supply tank 28 in heat exchanging relationship with the water, to the cooling device 36, to the heat exchanger passage communicating through the electrolyte tank, and finally back to the heat exchange passage in the heat sink. In alternative arrangements, the heat exchange fluid may be circulated through one or more components in parallel with one another instead of a series circuit with different portions of the circuit being open and closed selectively depending upon the desired locations where heat is to be withdrawn and the desired locations where heat is to be provided to maintain optimal operating efficiency of the system.

Turning now to the electrode configuration in the electrolyte tank, the electrodes include a cathode assembly comprising three cathode units 52 and an anode assembly comprising three anode units 54.

Each cathode unit is comprised of a U-shaped tube having a generally horizontal base portion 56 supported in the tank in close proximity to the bottom end thereof to extend in the longitudinal direction between opposing ends of the tank, and two vertical leg portions 58 extending upwardly from opposing ends of the base portion and communicating externally of the tank through the lid portion. Each cathode unit further comprises two generally rectangular plate portions 60 comprised of a perforated metallic mesh material sheet. The two plates are parallel and spaced apart by the diameter of the tube member received therebetween. The two legs and the base portion of the tube extend along the ends and the bottom such that the tube extends about three sides of the rectangular perimeter of each perforated sheet. The tube portion and the plate portions are all formed of stainless steel conductively joined to one another. The three cathode units are mounted in parallel side-by-side relationship within the tank such that each unit is spaced apart from adjacent units by the diameter of the tube material approximately. In this manner six plate portions 60 collectively define the cathode assembly at even spacing between the plate portions in the lateral direction.

The middle one of the three cathode units is longitudinally offset from the other two units such that the leg portions of the tubes are further apart from one another than the plate portions where most of the electrolysis takes place.

The hollow passage of each of the three tubes of the three cathode units collectively define the heat exchange passage extending through the electrolytic tank for receiving heat exchange fluid from the coolant system circulated therethrough in operation. A suitable inlet manifold and outlet manifold communicate with the inlets of the three tubes and the outlets of the three tubes at a location externally of the electrolytic tank respectively.

The three anode units 54 each similarly comprise two plate portions 62 of rectangular, perforated mesh sheet material which are mounted parallel and spaced apart from one another by approximately the tube diameter. The plate portions of the anode units are similarly sized in height and length in the longitudinal direction relative to the plate portions of the cathode units. Each pair of plate portions 62 forming one anode unit 54 are mounted together by two rigid posts 64 joined to the top edge of the two plates at longitudinally spaced positions therealong towards opposing ends of the plates at the top end thereof. The bottom ends of the posts are fixed to span laterally between the corresponding two plates with the posts extending upwardly therefrom to communicate to the exterior of the tank through the lid portion. The posts 64 may comprise a solid conductor rod or a hollow conductive tube.

The plates of the anode units are suspended within the electrolyte tank in alternating configuration with the plates of the cathode units such that each plate of the anode assembly is equidistant between two plates of the cathode assembly and similarly each plate of the cathode assembly is equidistant between two plates of the anode assembly. The anode plates are sized and positioned so as not to communicate with any portion of the cathode unit including the peripheral tube portion thereof. Similarly the anode plates are positioned such that the conductive posts 64 thereof do not directly contact the plates of the cathode assembly.

The middle one of the three anode units is also longitudinally offset from the other units so that the posts are farther apart from one another than the plates.

Non-conductive spacers 66 are provided for mounting between the plate portions of the anode and cathode to maintain a uniform spacing therebetween. In the illustrated embodiment two sets of spacers are provided at longitudinally spaced apart positions along the plates. Each set of spacers 66 comprises a single rectangular sheet of plastic insulating material having slots cut vertically therein to define a plurality of laterally spaced apart and vertically extending fingers which can be slidably inserted downwardly over top of the plate portions of the anode and cathode. Accordingly each finger has a lateral dimension corresponding to approximately the radius of the tube diameter, minus the thickness of the plate portions, so as to fully span the corresponding gap in the lateral direction between one anode plate and a corresponding adjacent cathode plate.

The posts of the anode assembly and the leg portions of the tubes of the cathode assembly all extend upwardly through respective holes in the lid portion with suitable sealing being provided at each location to prevent any escape of gases or electrolytic fluid through the lid other than the escape of produced gases through the gas outlet or the introduction of water from the water supply tank through the fill line.

The electrolytic system generally operates by monitoring the accompanying internal combustion engine such that as demand for fuel in the engine increases, more current is supplied by the power source to the electrodes of the electrolyte tank to produce more gases by electrolysis which are in turn directed to the intake of the engine.

In warmer climates, the heat exchange fluid is typically circulated through the heat sink of the power source to collect heat therefrom and through the heat exchange passage through the tubes of the cathode assembly to also collect heat therefrom for subsequent rejection of heat at the cooling device 36. Heat exchange fluid may optionally be circulated through the water supply tank as well to either add or remove heat from the water supply tank as may be desired to optimize performance.

In operation in colder climates or colder seasons, the heat exchange fluid is typically circulated so as to collect heat from the heat exchange passage through the cathode assembly tubes, and optionally collect heat from the heat sink of the power source, while rejecting heat from the heat exchange fluid into the water supply tank to prevent freezing of water in the supply tank. At initial startup, heat from the power source heat sink may be used to initially warm the electrolyte in the electrolyte tank by circulation through the heat exchange passage in the cathode assembly, again for optimal performance.

In one embodiment the cooling device 36 comprises a radiator which is mounted in the wall of the housing so as to permit convective cooling to occur at the exterior of the housing by circulating the heat exchange fluid therethrough.

In another embodiment, the cooling device 36 comprises a chiller unit operating a refrigeration cycle by circulating a refrigerant therethrough in heat exchanging relationship with the heat exchange fluid of the coolant system to thereby provide cooling to the heat exchange fluid. In either instance the cooling device is primarily used in warmer operating conditions.

Since various modifications can be made in my invention as herein above described, it is intended that all matter contained in the accompanying specification shall be interpreted as illustrative only and not in a limiting sense.

The invention claimed is:

1. An electrolytic system for an internal combustion engine comprising:
    an electrolytic tank for receiving an electrolytic fluid therein;
    a plurality of electrodes including at least one anode and at least one cathode supported in the electrolytic tank for communication with the electrolytic fluid therein;
    a power source arranged to apply an electrical potential between said at least one anode and said at least one cathode so as to generate a current through the electrolytic fluid and produce an electrolytic reaction in the electrolytic tank which produces combustible gases;
    a gas outlet arranged to direct a flow of the combustible gases from the electrolytic tank to the internal combustion engine;
    a hollow passage within at least one of the plurality of electrodes, in which the hollow passage does not communicate with the electrolytic fluid in the electrolytic tank; and
    a coolant system arranged to circulate a heat exchange fluid through the hollow passage in said at least one of the plurality of electrodes so as to be arranged to exchange heat with said at least one of the plurality of electrodes;
    wherein said at least one of the plurality of electrodes includes (i) a hollow tube portion formed of conductive material having opposing end portions extending through a boundary of the electrolytic tank externally to the power source in which the hollow tube portion at least partially defines the hollow passage therein and ii at least one plate portion of conductive material comprising a perforated plate joined conductively to said at least one hollow tube portion.

2. The system according to claim 1 wherein the hollow passage extends through at least a portion of said at least one cathode in the electrolytic tank.

3. The system according to claim 1 wherein the hollow tube portion of said at least one of the plurality of electrodes comprises a plurality of hollow tube portions extending through the electrolytic tank independently of one another, the plurality of hollow tube portions collectively defining said hollow passage therein.

4. The system according to claim 1 wherein the hollow tube portion of said at least one of the plurality of electrodes extends about at least a portion of a perimeter of said at least one plate portion within the electrolytic tank.

5. The system according to claim 1 wherein said at least one plate portion of said at least one of the plurality of the electrodes comprises a pair of plates mounted parallel and spaced apart from one another at diametrically opposing sides of the respective hollow tube portion.

6. The system according to claim 1 further comprising a cooling device supported externally of the electrolytic tank, wherein the coolant system is arranged to circulate the heat exchange fluid between said hollow passage and the cooling device.

7. The system according to claim 6 wherein the cooling device comprises a radiator receiving the heat exchange fluid therethrough and a cooling fan arranged to direct a flow of air across the radiator.

8. The system according to claim 6 wherein the cooling device comprises a refrigeration device arranged to undergo a refrigeration cycle for cooling the heat exchange fluid circulated therethrough.

9. The system according to claim 1 further comprising a heat sink on the power source which is arranged to receive the heat exchange fluid of the coolant system circulated therethrough.

10. The system according to claim 1 further comprising a water tank operatively connected to the electrolytic tank for replenishing fluid in the electrolytic tank and a heat exchange passage in heat exchanging relationship with the water tank which is arranged to receive the heat exchange fluid of the coolant system circulated therethrough.

11. The system according to claim 1 wherein the gas outlet comprises a rigid tube fully spanning between an inlet end at the electrolytic tank and an outlet end at a combustion air intake of the internal combustion engine in which the outlet end is at greater elevation than the inlet end.

12. The system according to claim 11 wherein the rigid tube comprises a stainless steel tube.

13. The system according to claim 11 further comprising an expansion chamber connected in series with the gas outlet proximate the outlet end of the rigid tube so as to be arranged to reduce pressure and condense water vapor in the flow of the combustible gases prior to reaching the intake of the internal combustion engine.

\* \* \* \* \*